United States Patent
Bletscher et al.

(10) Patent No.: US 10,933,570 B2
(45) Date of Patent: Mar. 2, 2021

(54) MOULD CLOSING UNIT WITH HEAT MANAGEMENT

(71) Applicant: ARBURG GMBH + CO KG, Loßburg (DE)

(72) Inventors: Rainer Bletscher, Baiersbronn (DE); Martin Krötz, Alpirsbach (DE)

(73) Assignee: ARBURG GMBH & CO. KG, Lossburg (DE)

( * ) Notice: Subject to any disclaimer, the term of this patent is extended or adjusted under 35 U.S.C. 154(b) by 70 days.

(21) Appl. No.: 16/341,256

(22) PCT Filed: Oct. 13, 2017

(86) PCT No.: PCT/EP2017/076248
§ 371 (c)(1),
(2) Date: Apr. 11, 2019

(87) PCT Pub. No.: WO2018/069529
PCT Pub. Date: Apr. 19, 2018

(65) Prior Publication Data
US 2020/0039134 A1    Feb. 6, 2020

(30) Foreign Application Priority Data
Oct. 13, 2016  (DE) ............... 10 2016 119 581.2

(51) Int. Cl.
*B29C 45/66* (2006.01)
*B29C 45/72* (2006.01)
(Continued)

(52) U.S. Cl.
CPC ............ *B29C 45/66* (2013.01); *B29C 45/72* (2013.01); *B29C 45/83* (2013.01); *B29C 45/84* (2013.01);
(Continued)

(58) Field of Classification Search
CPC ......... B29C 45/66; B29C 45/72; B29C 45/83; B29C 2045/1792; B29C 2045/835; B29C 2045/7271
See application file for complete search history.

(56) References Cited

U.S. PATENT DOCUMENTS 4,290,701 A * 9/1981 Schad ................. B29C 45/5008
                                                                                366/77
5,585,126 A * 12/1996 Heindl ................ B29C 45/1751
                                                                                425/589
(Continued)

FOREIGN PATENT DOCUMENTS

AT          12643 U1    9/2012
DE   102006024712 A1   12/2007
(Continued)

OTHER PUBLICATIONS

International Search Report for corresponding application PCT/EP2017/076248 filed Oct. 13, 2017; dated Dec. 7, 2017.

*Primary Examiner* — Xiao S Zhao
*Assistant Examiner* — Emmanuel S Luk
(74) *Attorney, Agent, or Firm* — Cantor Colburn LLP (57) ABSTRACT

A mould closing unit (100) for an injection-moulding machine has an electromechanical closing mechanism (M) for opening and closing an injection mould, said electromechanical closing mechanism (M) being actuated by means of at least one spindle unit (10) having at least one spindle (12) and at least one spindle nut (14). Cooling by way of cooling ducts (32) for heat dissipation from the spindle unit (10) is provided. Since the spindle (12) has, in the core, at least one bore (24) in which a cooling and/or lubricating medium is passed into the region of the contact points between the spindle nut (14) and the spindle (12) via at least one lance (20), efficient cooling of the spindle unit is achieved.

19 Claims, 4 Drawing Sheets

(51) Int. Cl.
 B29C 45/83 (2006.01)
 B29C 45/84 (2006.01)
 F16C 19/38 (2006.01)
 F16C 19/54 (2006.01)
 F16C 37/00 (2006.01)
 B29C 45/17 (2006.01)

(52) U.S. Cl.
 CPC .......... *F16C 19/386* (2013.01); *F16C 19/543* (2013.01); *F16C 37/007* (2013.01); *B29C 2045/1792* (2013.01); *B29C 2045/835* (2013.01); *F16C 2322/00* (2013.01)

(56) References Cited

U.S. PATENT DOCUMENTS

| | | | | |
|---|---|---|---|---|
| 6,026,696 | A * | 2/2000 | Hehl | B29C 45/07 74/411 |
| 6,468,449 | B1 * | 10/2002 | Fujikawa | B29C 45/6714 264/328.1 |
| 6,659,753 | B2 * | 12/2003 | Bleier | B29C 45/5008 425/145 |
| 6,865,963 | B2 * | 3/2005 | Takanohashi | B29C 45/83 184/6.21 |
| 8,221,107 | B2 * | 7/2012 | Hehl | B29C 45/72 425/143 |
| 9,090,016 | B2 * | 7/2015 | Takeuchi | B29C 45/83 |
| 2002/0119211 | A1 * | 8/2002 | Bleier | B29C 45/83 425/145 |
| 2002/0172733 | A1 * | 11/2002 | Takanohashi | F16H 25/2204 425/107 |
| 2003/0175381 | A1 * | 9/2003 | Wohlrab | B29C 45/68 425/589 |
| 2003/0185091 | A1 * | 10/2003 | Koike | B29C 48/85 366/92 |
| 2005/0255186 | A1 * | 11/2005 | Hiraga | F16H 25/24 425/542 |
| 2009/0230789 | A1 * | 9/2009 | Markert | F16C 37/007 310/54 |
| 2011/0159132 | A1 * | 6/2011 | Urata | B29C 45/83 425/107 |
| 2011/0293773 | A1 * | 12/2011 | Hehl | B29C 45/66 425/547 |
| 2014/0227381 | A1 * | 8/2014 | Takeuchi | B29C 45/76 425/107 |
| 2016/0377123 | A1 * | 12/2016 | Yoshino | F16C 37/007 384/476 |

FOREIGN PATENT DOCUMENTS

| | | |
|---|---|---|
| DE | 102008051285 B3 | 7/2010 |
| DE | 102010051766 A1 | 5/2011 |
| DE | 102012108061 A1 | 3/2014 |
| EP | 2774742 A1 | 9/2014 |
| JP | 2006247885 A | 9/2006 |
| WO | 9404337 A1 | 5/1994 |

* cited by examiner

MOULD CLOSING UNIT WITH HEAT MANAGEMENT

CROSS-REFERENCE TO RELATED APPLICATIONS

The present application refers to and claims the priority of the German patent application 10 2016 119 581.2, filed on 13 Oct. 2016, the disclosure of which is hereby expressly incorporated by reference into the subject matter of the present application in its entirety.

FIELD OF THE INVENTION

The invention relates to a mould closing unit for injection moulds on an injection moulding machine for processing plastics materials and other plasticizable masses such as ceramic or powdery masses, according to the preamble of claim 1.

PRIOR ART

Injection moulding machines and mould closing units for injection moulding machines with cooling concepts for heat or power dissipation are known in different forms. The necessity of a cooling concept arises from the large efficiency losses which are introduced into the system by means of a friction increase due to the thermal expansion of the individual elements, in order to protect the elements against increased wear and thermal overload.

From DE 10 2008 051 285 B3, there is known a mould closing unit with a direct cooling of the bearing position of the spindle drive and/or a cooling plate associated with one of the bearing positions. Cooling channels pass through the bearing position and/or the cooling plate associated with the bearing position, so that by means of the direct cooling, an increased working life of the spindle system and an increased working life of the bearing result.

From EP 0 658 136 B1 a mould closing unit is known in which a liquid-cooled servomotor is used as a symmetrical drive and force-transmission system. The servomotor drives a lead screw which is connected rotationally fixed to a crosshead engaging with the toggle joint system or systems. By this means, there results a minimum size and it is possible also to apply very large torques even during a stoppage. The heat energy conducted away by the water as a cooling medium from the electric servomotor can be recovered and subsequently used, for example, for mould temperature control.

In DE 10 2010 051 766 A1, a spindle drive for an injection moulding machine is disclosed which comprises a lubrication region between the spindle and the spindle nut and a sealing region. Situated at one end of the lubrication region is a first lubrication oil seal which delimits the lubrication region and abuts the spindle. Situated at the same end of the lubrication region at the side of the first lubrication oil seal facing away from the lubrication region is a second lubrication oil seal abutting the spindle. By means of the first seal, lubrication oil is held in the lubrication region. If, nevertheless, lubrication oil penetrates into the sealing region, the lubrication oil is wiped off by the second seal, so that the lubrication oil can flow away through an outlet opening arranged between the two seals. The aim is a targeted lubrication and lubricant removal at a drive spindle, whereby thermal considerations play no part.

A preform for the manufacturing of containers, in particular PET bottles, by means of stretch blow moulding is disclosed in DE 10 2012 108 061 A1. The mould cavity consists of a cavity, a core, a collar ring, a support ring and a bottom insert. The bottom part has a substantially conical portion and a gate point arranged on the hollow cylinder axis, whereby a connecting portion with a curved outer wall is provided between the conical portion and the gate point. For the most rapid possible cooling of the moulding material within the core, a feed channel is provided through which cooling water can be fed into the core. What is concerned here is thus the cooling of a die cavity, but not the cooling of mechanically cooperating components.

Nevertheless, with these solutions according to the prior art, due to the heat generation, thermal expansion of the individual components of the spindle unit also still occurs, which as a consequence, again leads to a greater power loss, caused by the increased friction in the interior of the spindle unit.

OBJECT OF THE INVENTION

Proceeding from this prior art, it is an object of the present invention to achieve a more efficient cooling of the spindle unit.

This object is achieved with a mould closing unit according to the features of claim 1. Advantageous developments are the subject matter of the dependent claims. The features set forth individually in the claims are combinable in a technically useful manner and can be enhanced by means of explanatory circumstances in the description and details from the drawings, whereby further embodiments of the invention are revealed.

DISCLOSURE OF THE INVENTION

The mould closing unit comprises at least one first, preferably stationary mould carrier and a mould carrier that is movable relative to the first mould carrier, which together define a mould clamping chamber. A support element is also provided for an electromechanical closing mechanism which is actuated by means of at least one spindle unit and engages with the movable mould carrier, so that said mould carrier is cyclically moved and can be driven into an opening position and a closing position in relation to an injection mould. The spindle unit comprises at least one spindle, at least one spindle nut cooperating with the spindle and mounted in a bearing unit, and at least one motor mounted in a bearing element. For cooling, cooling elements pass through at least the bearing unit and/or the bearing element. According to the invention, the spindle has at least one bore in the core in which a coolant and/or lubricant is fed via at least one lance into the region of the points of contact between the spindle nut and the spindle, whereby the heat quantity arising can be conducted away and an efficient cooling of the spindle unit results. In principle, the invention can be transferred, not only to injection moulding machines, but also to other machines which have at least one spindle unit.

The bearing element encloses, with the support element, a bearing chamber in which the bearing unit is arranged and which is filled with the coolant and/or lubricant. Preferably, the bearing chamber is a closed bearing chamber in which cooling elements are provided, preferably in the form of a cooling coil for cooling the lubricant. As a result, a separation takes place between the transmission medium as cooling medium and the lubricant. Due to the volume of the bearing chamber, it is possible that advantageously sufficient coolant and/or lubricant is present for cooling and/or temperature control in the cooling path. A further advantage lies therein that the bearing unit is simultaneously lubricated, cooled and/or temperature-controlled.

The cooling system of at least two of the elements including the spindle unit, the spindle, the spindle nut, the bearing unit, the bearing elements and the motor is advantageously configured as a cooling path in parallel or series connection, e.g. with the requirement of feeding the coolest coolant and/or lubricant to the element with the greatest power loss. In this way, there results a need-based heat management with regard to a targeted cooling and/or temperature control. Also conceivable, however, are parallel connections of different cooling paths and/or of individual cooling channels of the individual elements of the spindle unit or combinations of series and parallel connections, so that an individual cooling concept adapted to the respective requirements can be created. Single path cooling systems and combinations thereof with parallel connections are also conceivable. It is also possible to configure the cooling paths freely, e.g. from outside inwardly so that, for example, the coolest coolant and/or lubricant is not fed to the element with the greatest power loss. However, any freely desired other arrangement of the elements in the cooling path is also conceivable.

Preferably, the cooling path is configured as a series connection of the elements from within the spindle unit outwardly. For example, the cooling path begins at the spindle and extends via the spindle nut and via the cooling coil into the motor. It is also conceivable, however, to guide coolant in a series connection from the spindle via the motor to the spindle nut, i.e. in the order of the greatest heat generation. In both cases, due to a cascaded construction, an optimum cooling concept results, even with relatively large machines in which, firstly, the heat arises to a greater extent and, secondly however due to the changed, larger dimensions particularly in the interior of a spindle drive, the heat is more difficult to conduct away.

In order to ensure effective cooling for the spindle, the cooling path is preferably configured as a series connection, wherein advantageously, the spindle is the first part of the cooling path. By means of the cooling, it is prevented that the spindle expands thermally and that damage thus arises. Also conceivable, in principle however, is the cooling of the spindle at any other position within the cooling path. It is also conceivable that the cooling path is configured as a parallel connection or as a combination of series and parallel connection.

Advantageously, the coolant and/or lubricant comprises oil. Also conceivable, however, is any other medium that is capable of absorbing and giving up heat, for example, water, and/or that is suitable for lubricating.

For an adequate heat management of the individual elements, advantageously, the spindle and the bearing unit are spatially separated, which leads to a thermal decoupling and thus enables independent cooling and/or temperature control of the individual elements.

For an advantageous additional protective safeguarding of the cooling path, the motor has an integrated thermal overload protection.

In order to absorb large axial loads and for an optimal circulation of the coolant and/or lubricant by virtue of the conveying effect, the bearing unit is advantageously configured as an axial spherical roller bearing. The result therefrom is no dead spaces in which the coolant and/or lubricant can dwell for long periods and thereby block the cooling path. In principle, however, other bearing units, such as for example, ball bearings are also usable.

Preferably, the bearing unit is likewise configured as a conveying means at least assisting the conveying of the coolant and/or lubricant.

For extremely high accuracy, apart from the normal cooling, advantageously, the spindle unit can be specifically temperature-controlled by means of the coolant and/or lubricant.

Particularly advantageously for a high degree of precision and good force transmitting properties with a relatively high packing density, the spindle unit is configured as a planetary roller screw drive. Also conceivable, however, are other force-transmitting units, for example, a ball screw drive or screw drives of all types.

For simple assembly, the bearing element is advantageously configured as a separate element and is not integrated into the support element. Due to the local decoupling of the bearing element and the support element, advantageously no additional transverse forces act upon the bearing element due to the deformation of the support element.

In addition to the gravity compensation in relation to a good retention of the spindle, the support element preferably also has additional radial support elements.

It is advantageous if the spindle nut and/or the bearing chamber has at least one cooling coil for conducting away heat energy arising. The cooling coil is preferably configured as a liquid cooler in a 2-circuit system. Also conceivable, however, is any other embodiment of the cooling coil and its arrangement, for example, as an external cooling arrangement or air/liquid cooling concept.

A bearing chamber cooled by lubricant and/or coolant is advantageously provided in which there is accommodated a lubricant for the cooperating parts of the spindle unit. Thus there is enabled a heat management system with two different cooling circuits which likewise enables a good cooling as well as a good cooling of the spindle unit.

If, in addition, the lubricant is advantageously arranged to be circulated by a movement of the bearing unit resulting from the cooperation of the parts of the spindle unit, a homogeneous distribution of the lubricant in the bearing chamber and thus a heat distribution in this region between the spindle nut and the spindle can be achieved.

Further advantages are disclosed in the subclaims and the following description of a preferred exemplary embodiment. The features set forth individually in the claims are combinable in a technically useful manner and can be supplemented by means of explanatory matters in the description and details from the drawings, wherein further modifications of the invention are illustrated.

SHORT DESCRIPTION OF THE FIGURES

The invention will now be described in greater detail by reference to an exemplary embodiment illustrated in the accompanying Figures. In the Figures:

FIG. 3 shows a sectional view from the side of a part of the spindle unit with parts of the mould closing unit and circulation of the coolant and/or lubricant marked in.

DETAILED DESCRIPTION OF PREFERRED EXEMPLARY EMBODIMENTS

The invention will now be described in greater detail, by way of example, making reference to the accompanying drawings. The exemplary embodiments merely represent examples, however, which are not intended to restrict the inventive concept to a particular arrangement. Before the invention is described in detail, it should be noted that the invention is not restricted to the various components of the device and the various method steps, since these components and method can vary. The expressions used here are intended merely to describe particular embodiments and are not used restrictively. Furthermore, where the singular or the indefinite article is used in the description or the claims, this also relates to a plurality of these elements, provided the overall context does not clearly reveal otherwise.

Figure 1:
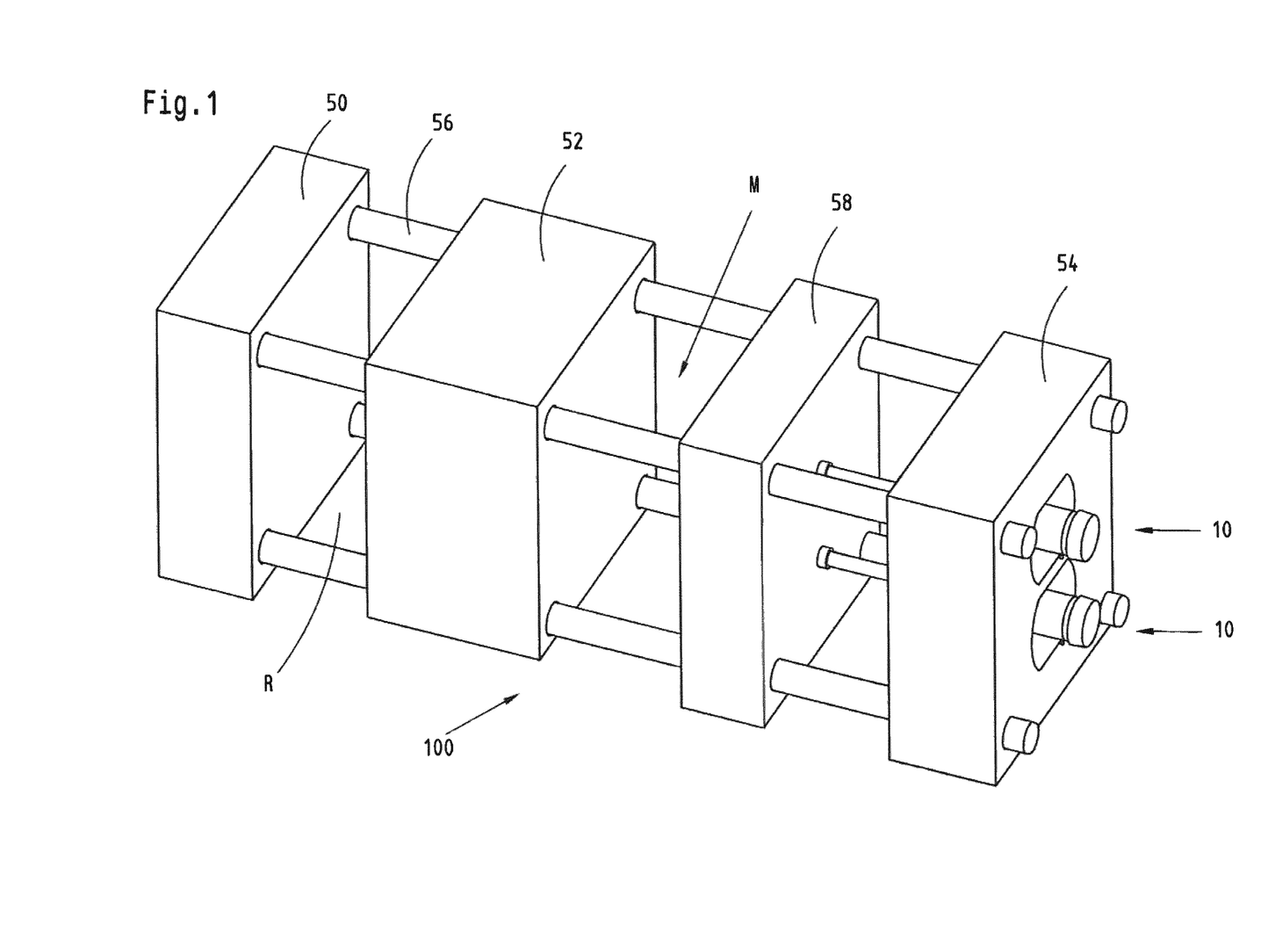
FIG. 1 shows a perspective view from obliquely above of a mould closing unit with two spindle units.

FIG. 1 shows a perspective view from obliquely above of a mould closing unit 100 for injection moulds on an injection moulding machine for processing plastics and other plasticizable masses such as ceramic or powdery masses with a first, preferably stationary mould carrier 50, a second movable mould carrier 52, which defines, with the stationary mould carrier 50, a mould clamping chamber R, and a closing mechanism M which engages with a support element 54 by means of a crosshead 58 on the movable mould carrier 52. Typically, a plasticizer unit (not shown in the drawing) is associated with the mould closing unit in FIG. 1 from the left side.

For a cyclical opening and closing of the injection mould, an electromechanical closing mechanism M is provided on the support element 54 and is configured in the exemplary embodiment as a toggle joint mechanism. Other drives, for example, spindle drives or hydraulic drives are also conceivable as is another support for the closing mechanism M, for example, in a two-plate system in which one of the mould carriers 50, 52 likewise forms the support element provided that an electromechanical closing mechanism is used. Through the actuation of the closing mechanism, the movable mould carrier 52 moves toward the stationary mould carrier 50 and away from it. The support element 54, the crosshead 58, the movable mould carrier 52 and the stationary mould carrier 50 are connected to one another via rods 56. These rods 56 can—but do not have to—serve simultaneously as a guide for the movable mould carrier 52. Alternatively, other force transmitting elements can also be provided which, for example, conduct the forces around the clamping chamber R. Preferably, the closing mechanism M is actuated by at least one spindle unit 10, in the exemplary embodiment in FIG. 1, by two spindle units 10.

Figure 2:
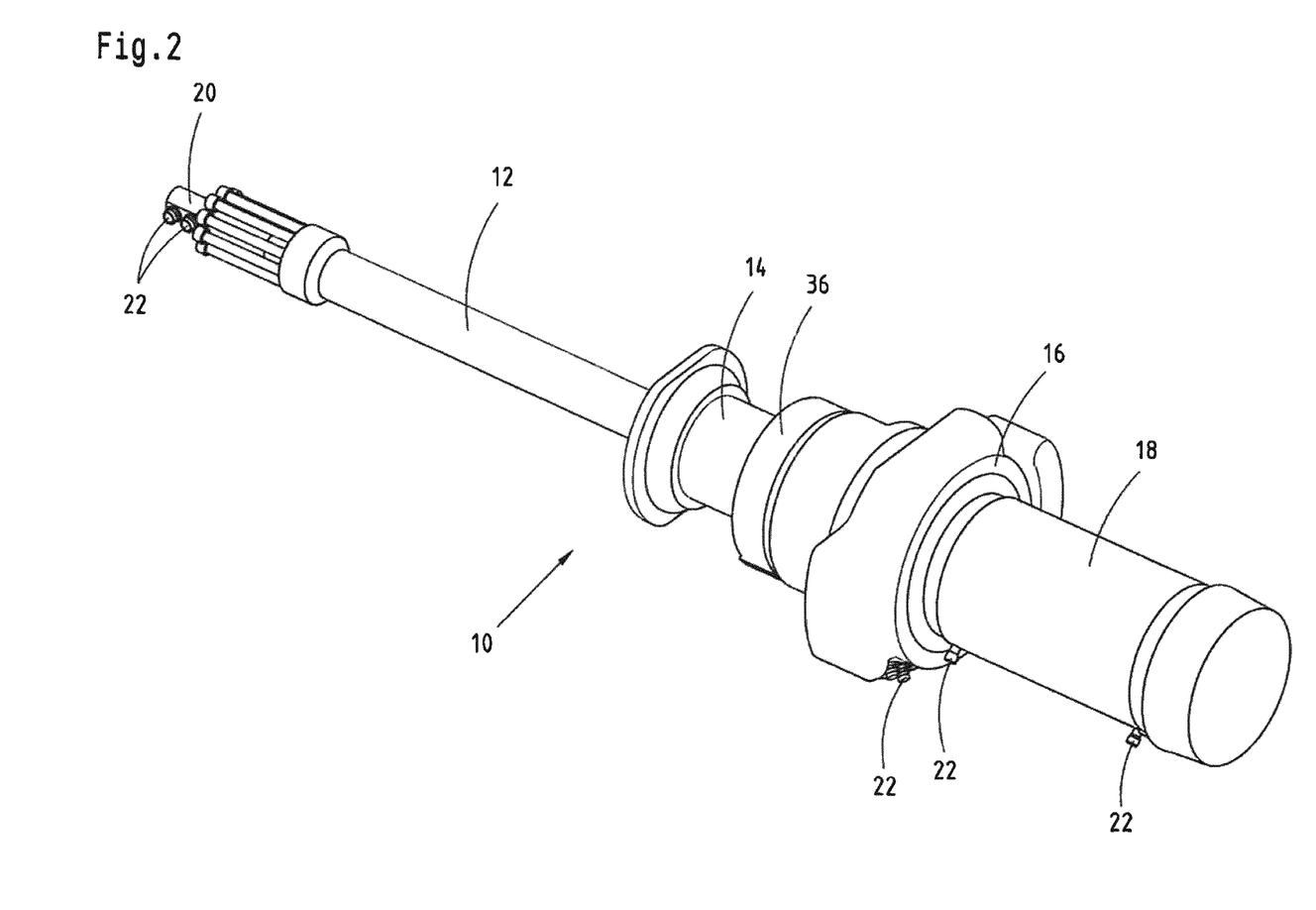
FIG. 2 shows a perspective view from obliquely above of the spindle unit according to FIG. 1.

FIG. 2 shows the spindle unit 10 of FIG. 1 in perspective from obliquely above. It comprises at least one spindle 12, at least one spindle nut 14 according to FIG. 3 which cooperates with the spindle 12 and is mounted in a bearing unit 30, and at least one motor 18 mounted on a bearing element 16. A cooling system with cooling elements such as cooling channels 32 or also the bearing chamber 26 for conducting away heat from the spindle unit 10 passes through, in accordance with FIGS. 3 and 4, at least the bearing unit 30 and/or the bearing element 16. Also conceivable in principle, however, are further cooling channels 32 through the spindle unit 10, for example, through the motor 18. In the exemplary embodiment, the spindle 12 has at least one bore 24 in the core, in which a coolant and/or lubricant is guided via at least one lance 20 into the region of the points of contact between the spindle nut 14 and the spindle 12, whereby advantageously an efficient cooling of the spindle unit 10 results. Cooling connections 22 for flange-mounting and/or connecting the cooling path or the cooling channels 32 are situated, according to FIG. 2, at least on the lance 20, the bearing element 16 and the motor 18.

Figure 3:
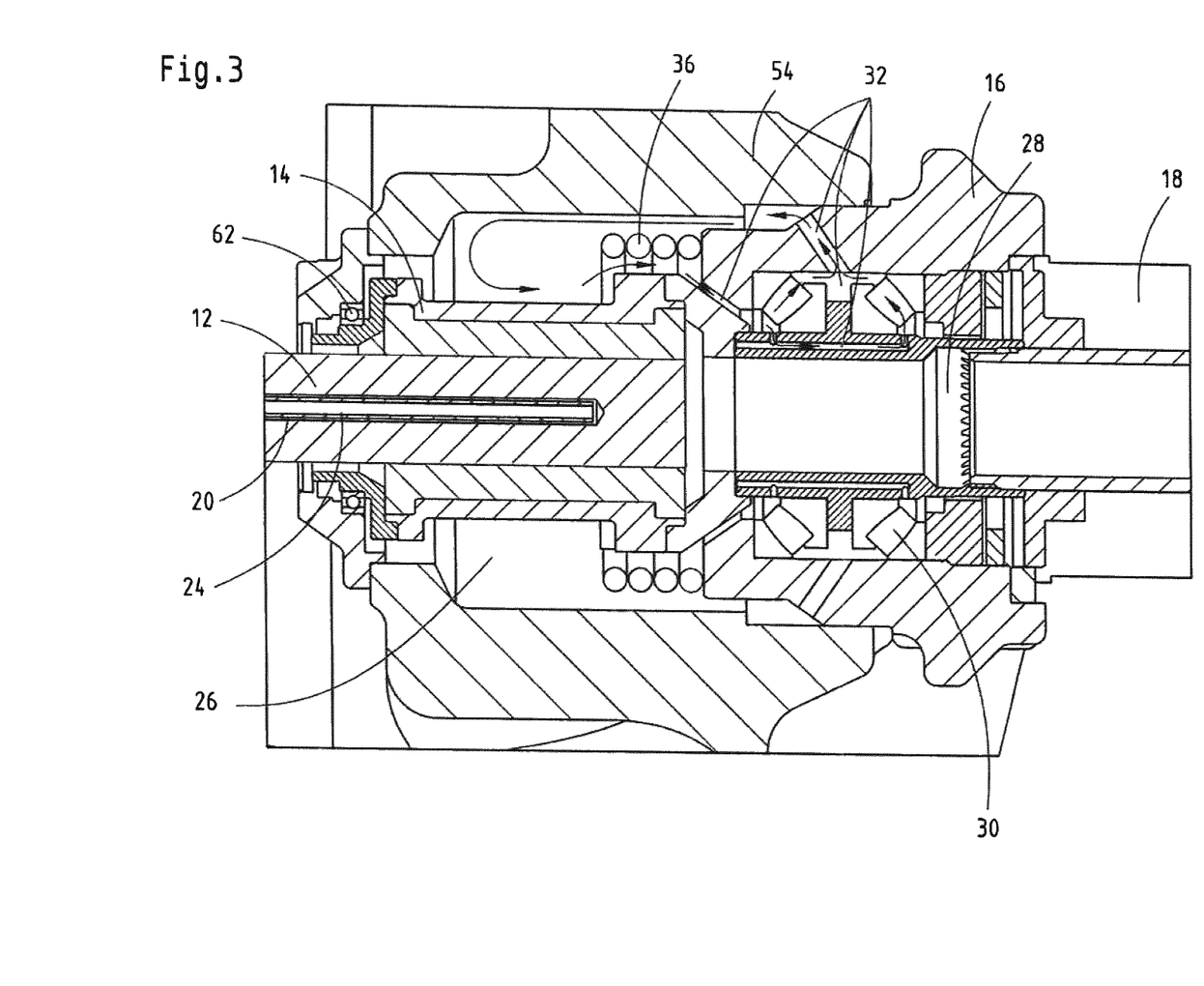
Figure 4:
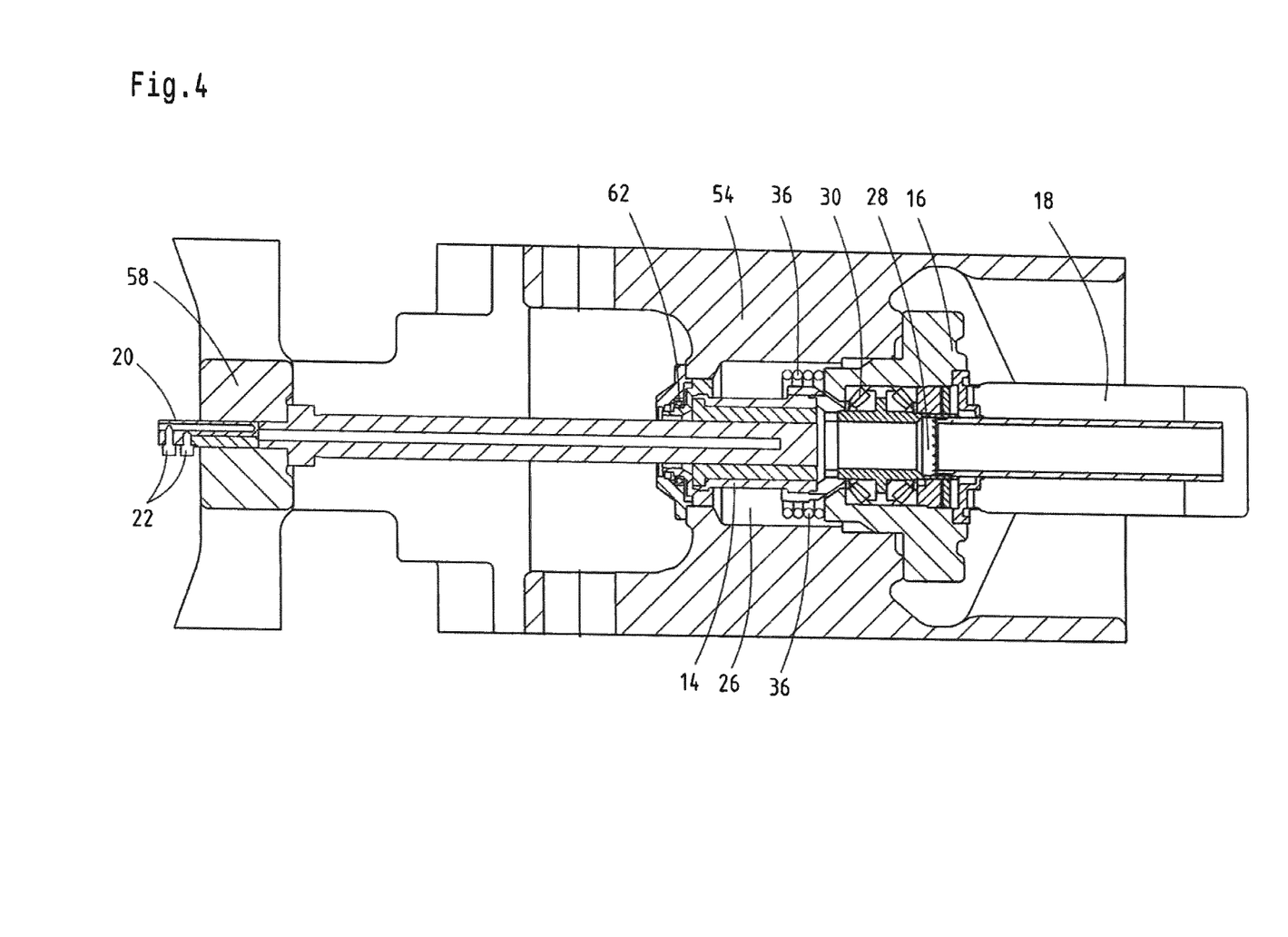
FIG. 4 shows a sectional view from above of the spindle unit with parts of the mould closing unit.

In a further preferred exemplary embodiment according to FIGS. 3 and 4, the bearing element 16 encloses, with the support element 54, a bearing chamber 26 in which the bearing unit 30 is arranged and which is filled with the coolant and/or lubricant. Preferably, the bearing chamber 26 is a closed or encapsulated bearing chamber in which cooling elements are provided, preferably in the form of a cooling coil 36 for cooling the lubricant. As a result, a separation takes place between the transmission medium as cooling medium and the lubricant.

The support element 54 is configured in a preferred exemplary embodiment as a support plate or, in a two-plate system, can be, for example, one of the mould carriers 50, 52.

Preferably, the cooling of at least two elements including the spindle 12, the spindle nut 14, the bearing unit 30, the bearing element 16 and the motor 18 is configured as a cooling path in series connection from inside the spindle unit 10 to the outside, with the proviso preferably of feeding the coolest coolant and/or lubricant to the element with the greatest power loss. For example, the cooling path begins at the spindle 12 and extends via the spindle nut 14 and via the cooling coil 36 into the motor 18. Thus, the spindle 12, the oil chamber and/or the bearing chamber 26 and the motor are cooled one after the other. For this purpose, in FIG. 2, cooling connections 22 of the spindle 12 are connected to the cooling connections 22 of the bearing element 16 and of the motor 18 in this order, so that the coolest coolant and/or lubricant reaches the spindle 12 first. The flow direction in the motor 18 is therein unimportant, so that a transfer of the coolant and/or lubricant directly from the bearing element 16 to the cooling connection 22 of the motor 18 is possible. Advantageously, projecting edges and hose lines are thereby minimized or eliminated. It is also possible to configure the cooling path freely, for example, from outside inwardly so that, for example, the coolest coolant and/or lubricant is not fed to the element with the greatest power loss. However, any desired other arrangement of the elements in the cooling path is also conceivable. Thus in a series connection, coolant can be fed from the spindle via the motor to the spindle nut, i.e. in the order of the heat generation.

Conceivable in principle, apart from a series connection, are parallel connections and/or a combination of series and parallel connection. Advantageously, with a parallel connection, individual and/or all of the cooling channels of the individual elements of the spindle unit 10 can be controlled individually and cooled and/or temperature-controlled independently of one another. A single-path cooling system or a combination of single-path cooling and parallel connection of the cooling channels 32 is conceivable. It is possible, for example, to cool the spindle 12 whilst the motor 18 is kept at a constant temperature.

In a particularly preferred exemplary embodiment, the cooling path is configured as a series connection, wherein the spindle 12 is the first part of the cooling path. Thereby, an effective cooling of the spindle 12 within the cooling path is ensured.

Oil is preferably used as the coolant and/or lubricant. Oil offers good properties with regard to the uptake and removal of heat energy and can advantageously be used simultaneously for lubricating elements of the spindle unit 10, for example, the bearing unit 30. However, other coolants and/or lubricants are also conceivable.

In order to realize an adequate heat management of the individual components of the spindle unit 10, the spindle 12 and the bearing unit 30 are preferably spatially separated in accordance with FIGS. 3 and 4. Furthermore, the motor 18 drives the rotating element of the spindle 12 and the spindle nut 14, in the exemplary embodiment the spindle nut 14, via a drive shaft 28. By means of the spatial separation, the elements are thermally decoupled and it is thus possible to cool or temperature-control the elements individually. In principle, however, the spatial separation of further elements of the spindle unit 10, such as for example, the motor 18 is also conceivable.

Preferably, the motor 18 has an integrated thermal overload protection as a protective safeguarding of the cooling path. It is thereby advantageously achieved that in the case of too high a temperature of the cooling path, it can be cooled or temperature-controlled by means of cold coolant and/or lubricant. For example, on a further temperature increase, a switching-off takes place, which protects against thermal overload.

In the exemplary embodiment according to FIGS. 3 and 4, the bearing unit 30 is configured as an axial spherical roller bearing. By means of the conveying effect of the spherical roller bearing, an optimum circulation of the coolant and/or lubricant in the bearing chamber 26 is achieved. Preferably, a separation between coolant and lubricant takes place thereby. Whilst the lubricant is accommodated encapsulated in the bearing chamber 26 and is conveyed by the bearing unit 30, it can be cooled by means of the coolant through the cooling coil 36. Therefore, no dead spaces arise in which the coolant and/or lubricant can dwell for long periods and can thus block the cooling path. Thus, the axial spherical roller bearing can likewise be configured as a conveying means at least assisting the conveying of the coolant and/or lubricant. In principle, however, other bearing units 30, such as for example, ball bearings which can also be configured as conveying means, are also conceivable. With the coolant and/or lubricant, it is preferably also possible to temperature-control the spindle unit 10 in a targeted manner.

The circulation of the coolant and/or lubricant is represented in the exemplary embodiment in FIG. 3 with the aid of arrows 64. In the preferably encapsulated bearing chamber 26, the circulation of the lubricant situated there and thus also the cooling is promoted by the conveying effect of the bearing unit 30. For this, the bearing unit 30 preferably comprises angular-contact ball bearings which preferably swirl the lubricant in the bearing chamber 26 during their movement. The coolant and/or lubricant thereby flows through the cooling channels 32 and passes the cooling coil 36. There thus arises a continuous circulation, so that a homogeneous temperature distribution comes about. Furthermore—supported by the conveying effect of the bearing unit 30—no dead spaces arise in which the coolant and/or lubricant can linger. Furthermore, by means of the cooling coil 36, the coolant and/or lubricant is cooled in the bearing chamber 26. Together, this effects a lubrication as well as a cooling of the spindle nut 14 and the bearing unit 30.

In the exemplary embodiment of FIG. 3, the cooling of the cooling coil 36 is separate from the circulation of the coolant and/or lubricant in the bearing chamber 26. Water, for example, is used as the coolant and/or lubricant for the cooling of the cooling coil 36, whereas by contrast, the coolant and/or lubricant for the circulation is, for example, oil. As a result at least two cooling circuits separated from one another are provided. In the first circuit, for example, water is used as the coolant and/or lubricant and via the lance 20 cools the spindle 12, thereafter via the cooling coil 36, the spindle nut 14 and the bearing chamber 26, and finally the motor 18. For the second cooling circuit, for example, oil is used as the coolant and/or lubricant. The oil circulates in the bearing chamber 26 and is cooled by the cooling coil 36. In addition, apart from the cooling, the oil effects a lubrication of the spindle nut 14 and the bearing unit 30 also. Both cooling circuits are preferably configured as, for example, a series and/or parallel connection.

In principle, it is however also conceivable that as an alternative, the cooling of the cooling coil 36 and the circulation in the bearing chamber 26 are not separated from one another and as a common coolant and/or lubricant, for example, oil is used. In this case, there is only one cooling circuit. For example, the "cold" oil as the coolant and/or lubricant then first causes cooling via the lance 20, the spindle 12, then via the cooling coil 36, the spindle nut 14 and thereafter is used for the circulation in the bearing chamber 26, and finally for cooling the motor 18. It is however also conceivable that there is a separate cooling circuit for each individual part of the cooling circuits. For example, there is a separate cooling circuit for the spindle 12, the spindle nut 14, the cooling coil 36, the bearing chamber 26, the bearing unit 30 and the motor 18.

In a particularly preferred exemplary embodiment, the cooling of the cooling coil 36 is integrated into the cooling path between, for example, the spindle 12 and the motor 18. For example, water is provided as the coolant and/or lubricant. For example, the coolant and/or lubricant is fed first by means of, for example, a series connection to the lance 20, thereafter to the cooling coil 36 and lastly to the motor 18. This results in a cooling path from the spindle 12 via the spindle nut 14 to the motor 18. In principle, however, any other arrangement of the cooling path is also conceivable. The circulation of the coolant and/or lubricant, for example, oil, in the bearing chamber 26 is separate from the cooling path in this exemplary embodiment.

What the different cooling paths therefore have in common is that a systemically and also thermally optimized heat removal from different heat sources takes place in a manner that is targeted and is adaptable to the respective requirements.

The overall spindle unit 10 is preferably configured as a planetary roller screw drive, whereby a high degree of precision and good force transmitting properties with a relatively high packing density characterise the spindle unit 10.

According to FIGS. 3 and 4, the bearing element 16 is preferably configured as a separate element and is not integrated into the support element 54 and is not a component thereof. This results in easy assembly and due to the decoupling between the bearing element 16 and the support element 54, no additional transverse forces act upon the bearing element 16 due to the deformation of the support element 54.

In the exemplary embodiment of FIGS. 3 and 4, the support element 54 has additional radial support means 62 for advantageous gravity compensation.

Preferably, the spindle nut 14 and/or the bearing chamber 26 has at least one cooling coil 36. The heat quantity arising can thus advantageously be efficiently released and the spindle nut 14 can be cooled and/or temperature-controlled.

Where, in the context of this application, reference is made to temperature control, this also includes, in principle, a cooling. Usually, cooling also takes place.

It is self-evident that this description can be subject to a great variety of modifications, amendments and adaptations, which belong within the scope of equivalents to the accompanying claims.

LIST OF REFERENCE NUMERALS

10 Spindle unit
12 Spindle

14 Spindle nut
16 Bearing element
18 Motor
20 Lance
22 Cooling connections
24 Bore
26 Bearing chamber
28 Drive shaft
30 Bearing unit
32 Cooling channels
36 Cooling coil
50 First, stationary mould carrier
52 Movable mould carrier
54 Support element
56 Rods
58 Crosshead
62 Support means
64 Arrow
100 Mould closing unit
R Mould clamping chamber
M Closing mechanism

The invention claimed is:

1. Mold closing unit for injection molds on an injection molding machine for processing plastics materials and other plasticizable masses, comprising
    at least one first mold carrier,
    at least one movable mold carrier that is movable relative to the first mold carrier, which together with the first mold carrier defines a mold clamping chamber for receiving an injection mold between the two mold carriers,
    at least one support element for at least one electromechanical closing mechanism for cyclically opening and closing the injection mold while moving the movable mold carrier toward and away from the first mold carrier,
    wherein the closing mechanism is actuated by at least one spindle unit which comprises at least one spindle, at least one spindle nut which cooperates with the spindle and is mounted in a bearing unit, and at least one motor mounted on a bearing element,
    a cooling system with cooling elements for conducting away heat from the spindle unit, wherein the cooling elements pass through at least one of the bearing unit or the bearing element, with a cooling path, in which the at least one spindle and thereafter the at least one spindle nut are arranged,
    wherein the at least one spindle has at least one bore in a core, in which at least one of a coolant or a lubricant is guided via at least one lance into a region of points of contact between the at least one spindle nut and the at least one spindle,
    wherein the cooling path is configured in series connection for cooling the at least one spindle via the at least one lance, then the at least one spindle nut via one of the cooling elements and at last the motor.

2. Mold closing unit according to claim 1, wherein the bearing element with the support element encloses a bearing chamber in which the bearing unit is arranged and which is filled with at least one of the coolant or lubricant.

3. Mold closing unit according to claim 2, wherein the bearing chamber is a closed bearing chamber in which the cooling elements are provided.

4. Mold closing unit according to claim 3, wherein the cooling elements are in the form of a cooling coil for cooling the lubricant.

5. Mold closing unit according to claim 1, wherein the cooling path is configured for a cooling of items comprising the at least one spindle, the at least one spindle nut, the motor and of at least one of the bearing unit or the bearing element.

6. Mold closing unit according to claim 5, wherein at least two of the items experiences a power loss, and where the cooling path is configured with the requirement of feeding previously unused coolant or lubricant to one of the at least two items with the greater power loss.

7. Mold closing unit according to claim 5, wherein the cooling path is configured as a series connection of elements from within the spindle unit outwardly.

8. Mold closing unit according to claim 5, wherein the at least one spindle is a first part of the cooling path.

9. Mold closing unit according to claim 1, wherein the at least one spindle and the bearing unit are spatially separated.

10. Mold closing unit according to claim 1, wherein the motor comprises an integrated thermal overload cutout.

11. Mold closing unit according to claim 1, wherein the bearing unit is configured as an axial spherical roller bearing.

12. Mold closing unit according to claim 1, wherein the bearing unit is concurrently configured as a conveying means at least assisting a conveying of at least one of the coolant or lubricant.

13. Mold closing unit according to claim 1, wherein the at least one spindle unit is temperature-controllable in a targeted manner by at least one of the coolant or lubricant.

14. Mold closing unit according to claim 1, wherein the at least one spindle unit is configured as a planetary roller screw drive.

15. Mold closing unit according to claim 1, wherein the bearing element is configured as a separate element and is not integrated into the support element.

16. Mold closing unit according to claim 1, wherein the support element comprises additional radial support means.

17. Mold closing unit according to claim 2, wherein at least one of the at least one spindle nut or the bearing chamber has at least one cooling coil.

18. Mold closing unit according to claim 1, wherein a bearing chamber cooled by at least one of the lubricant or the coolant is provided in which there is accommodated the lubricant for the cooperating parts of the spindle unit.

19. Mold closing unit according to claim 18, wherein the lubricant is arranged to be circulated by a movement of a bearing unit in the bearing chamber resulting from cooperation of the cooperating parts of the spindle unit.

* * * * *